United States Patent
Bataineh et al.

(10) Patent No.: US 10,757,022 B2
(45) Date of Patent: *Aug. 25, 2020

(54) INCREASINGLY MINIMAL BIAS ROUTING

(71) Applicant: Cray Inc., Seattle, WA (US)

(72) Inventors: Abdulla Bataineh, Irbid (JO); Thomas Court, Verona, WI (US); Duncan Roweth, Bristol (GB)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 16/197,159

(22) Filed: Nov. 20, 2018

(65) Prior Publication Data

US 2019/0109790 A1 Apr. 11, 2019

Related U.S. Application Data

(63) Continuation of application No. 15/437,201, filed on Feb. 20, 2017, now Pat. No. 10,142,235, which is a continuation of application No. 13/681,058, filed on Nov. 19, 2012, now Pat. No. 9,577,918.

(51) Int. Cl.
| | |
|---|---|
| *H04L 12/26* | (2006.01) |
| *H04L 12/801* | (2013.01) |
| *H04L 12/733* | (2013.01) |
| *H04L 12/721* | (2013.01) |
| *H04L 12/741* | (2013.01) |

(52) U.S. Cl.
CPC ............. *H04L 47/11* (2013.01); *H04L 45/12* (2013.01); *H04L 45/20* (2013.01); *H04L 45/54* (2013.01); *H04L 45/122* (2013.01)

(58) Field of Classification Search
CPC ...... H04L 47/125; H04L 45/20; H04L 45/122
See application file for complete search history.

(56) References Cited

U.S. PATENT DOCUMENTS

| | | | |
|---|---|---|---|
| 7,116,640 B2 | 10/2006 | Tasman et al. | |
| 7,426,577 B2 | 9/2008 | Bardzil et al. | |
| 7,633,940 B1 | 12/2009 | Singh et al. | |
| 8,976,672 B2 | 3/2015 | Thubert et al. | |
| 9,137,143 B2 | 9/2015 | Parker et al. | |
| 2010/0049942 A1 | 2/2010 | Kim et al. | |
| 2010/0168551 A1 | 7/2010 | Hof et al. | |
| 2010/0238925 A1 | 9/2010 | Karuppiah | |
| 2012/0144064 A1 | 6/2012 | Parker et al. | |
| 2012/0207161 A1 | 8/2012 | Uppali et al. | |
| 2013/0058235 A1 | 3/2013 | Johnsson et al. | |
| 2015/0109926 A1* | 4/2015 | Jin ..................... | H04W 40/22 370/235 |
| 2015/0177717 A1 | 7/2015 | Parker et al. | |

* cited by examiner

*Primary Examiner* — Shukri Taha
(74) *Attorney, Agent, or Firm* — Hewlett Packard Enterprise Patent Department

(57) ABSTRACT

A system and algorithm configured to generate diversity at the traffic source so that packets are uniformly distributed over all of the available paths, but to increase the likelihood of taking a minimal path with each hop the packet takes. This is achieved by configuring routing biases so as to prefer non-minimal paths at the injection point, but increasingly prefer minimal paths as the packet proceeds, referred to herein as Increasing Minimal Bias (IMB).

35 Claims, 10 Drawing Sheets

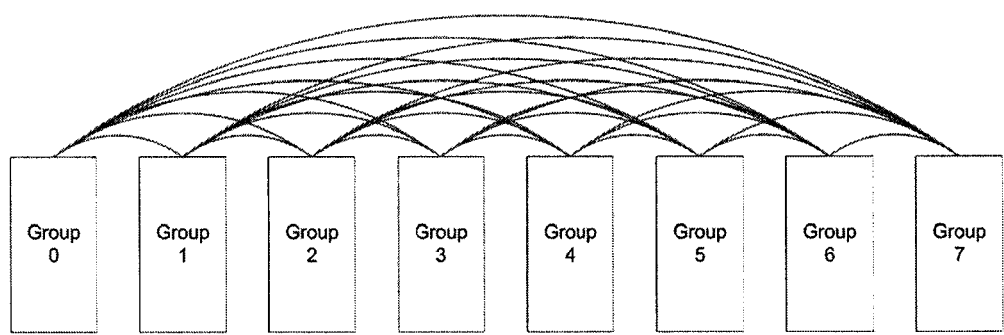
FIGURE 4 – ALL-TO-ALL NETWORK CONNECTING 8 GROUPS

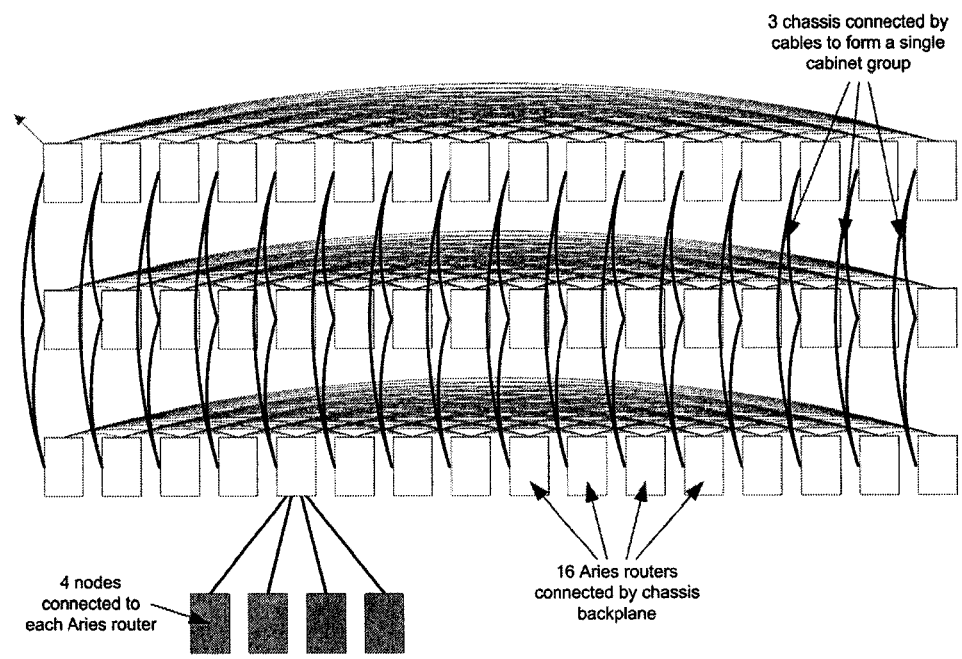
FIGURE 5 – SINGLE CABINET GROUP (48 ARIES)

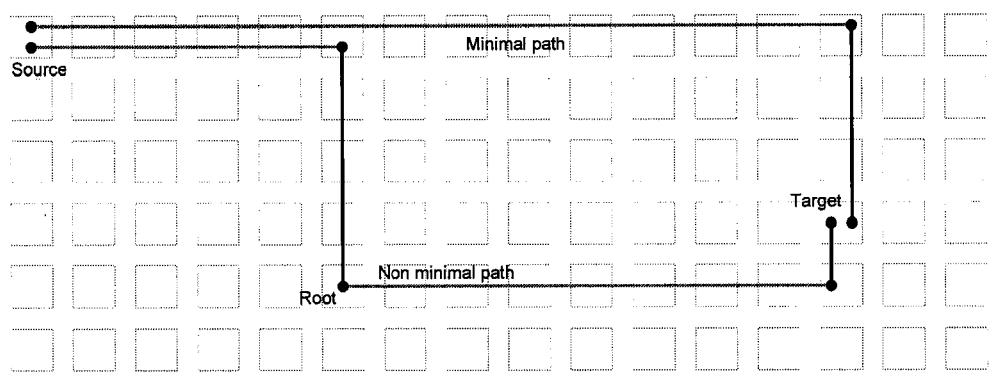
FIGURE 6 – LOCAL MINIMAL AND NON- MINIMAL PATHS IN A CASCADE GROUP (96 ARIES)

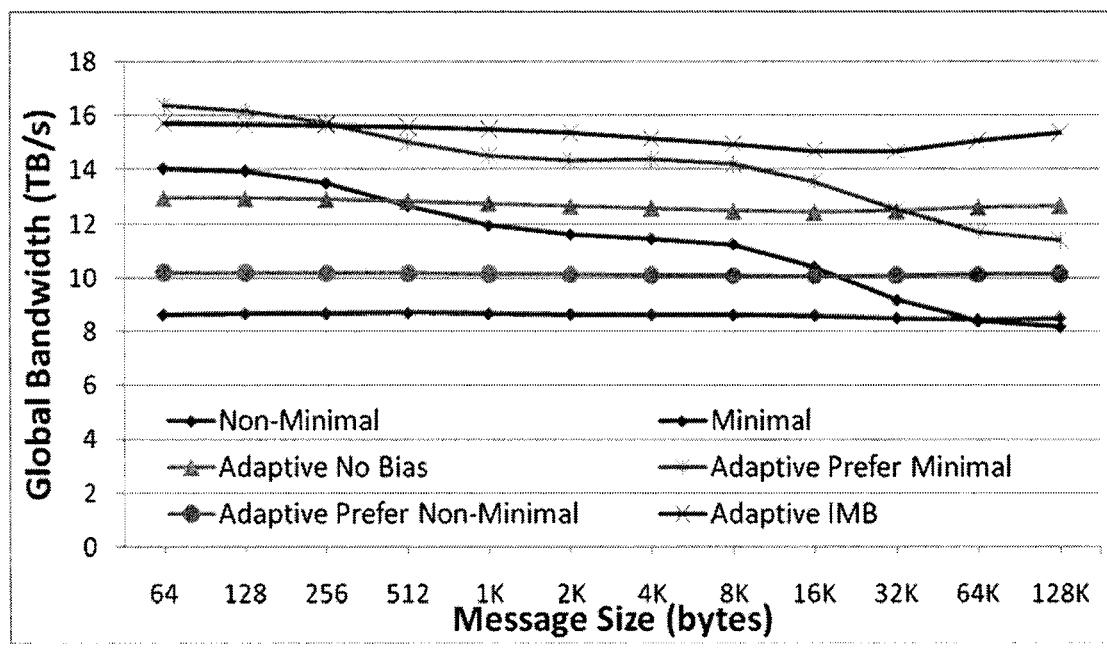
FIGURE 7 – ALL-TO-ALL PUTS, 8 GROUPS

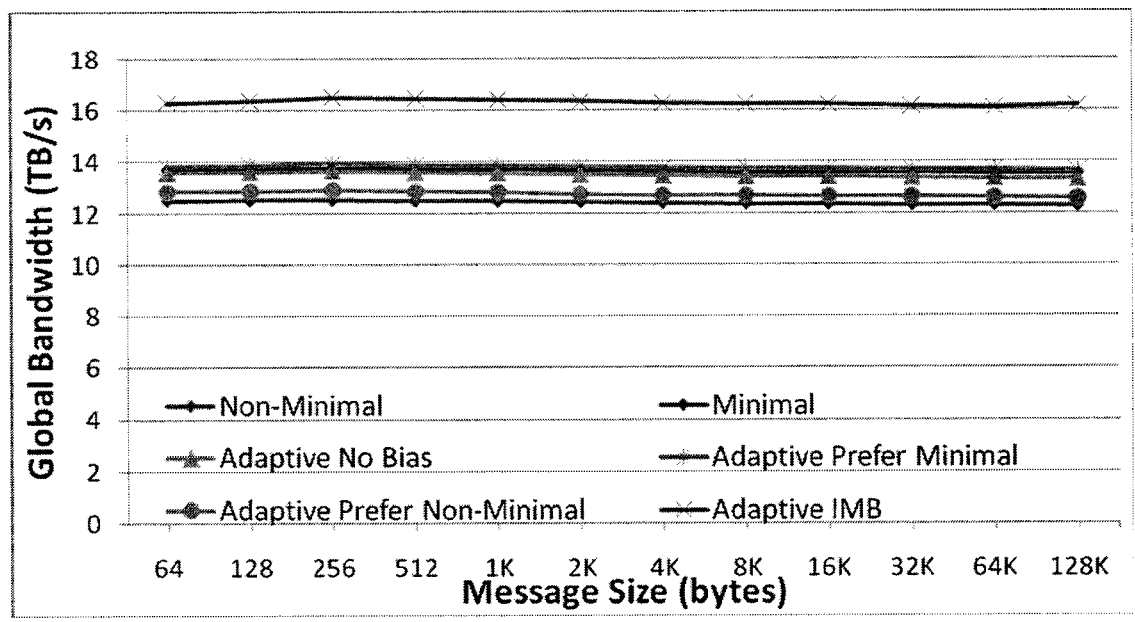
FIGURE 8 – ALL-TO-ALL GETS, 8 GROUPS

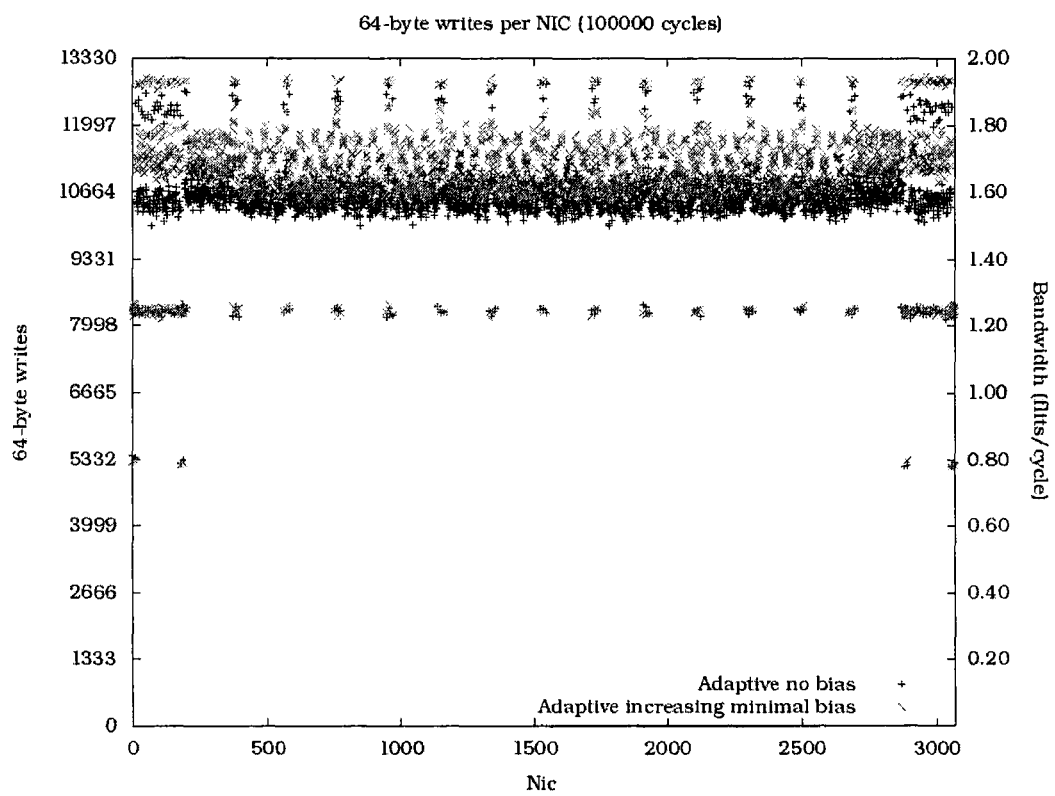
FIGURE 9 – PER NIC PERFORMANCE OF 64 BYTE WRITES OF SYNTHETIC NEAREST NEIGHBOR TRAFFIC

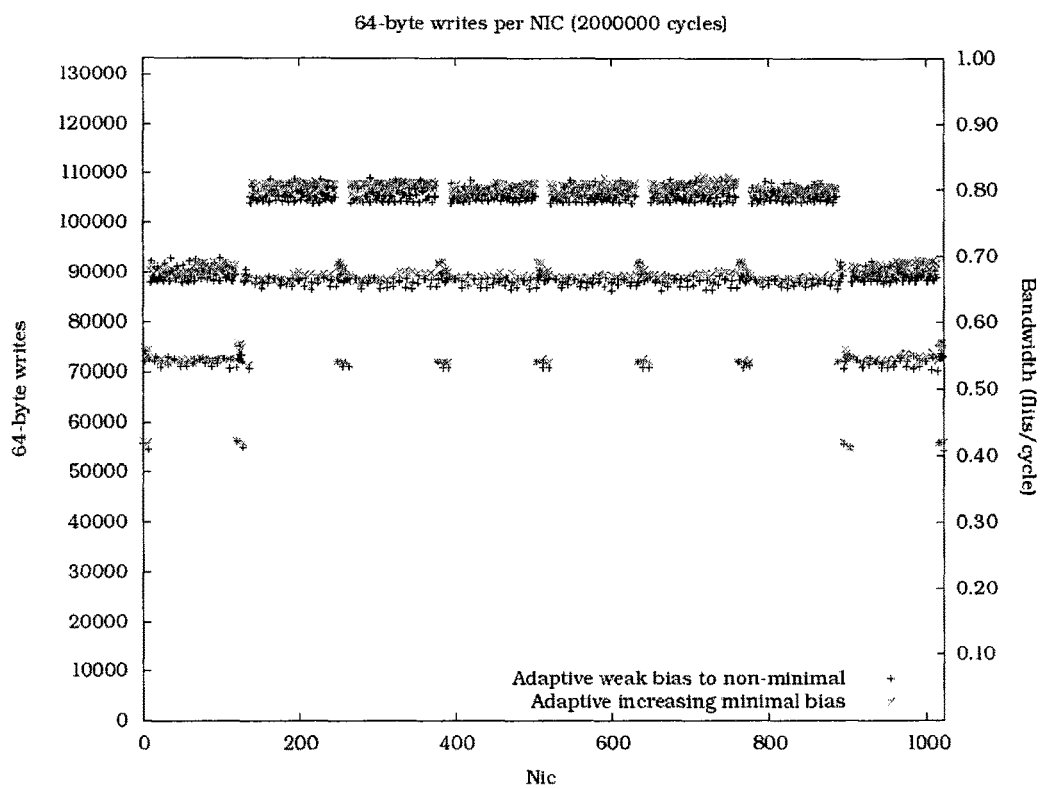
FIGURE 10 - PER NIC PERFORMANCE OF 64-BYTE WRITE TRAFFIC FROM THE CTH APPLICATION

INCREASINGLY MINIMAL BIAS ROUTING

RELATED APPLICATIONS

This is a continuation of U.S. patent application Ser. No. 15/437,201, filed, Feb. 20, 2017, now U.S. Pat. No. 10,142,235; which was a continuation of U.S. patent application Ser. No. 13/681,058, filed on Nov. 19, 2012, now U.S. Pat. No. 9,577,918.

GOVERNMENT RIGHTS

This invention was made with U.S. Government support under Contract Number B580786 awarded by Sandia Corporation. The U.S. Government has certain rights in this invention.

BACKGROUND OF THE TECHNOLOGY

Three classes of routing algorithm are established for Cray Inc. Dragonfly networks, minimal, non-minimal, and adaptive. They were developed as part of the Cascade project of Cray Inc. The minimal routing algorithm is optimal for traffic which is known to be uniformly distributed—each node communicates roughly equal amounts of data with all of the other nodes. The minimal routing algorithm is known not to be optimal for so called "worst case" traffic patterns in which all of the nodes in one group communicate exclusively with nodes in one other group. Non-minimal routing is known to perform better on such communication patterns; it distributes traffic over all groups, and from there to die destination. This approach is fair, but imposes a higher load (up to 2×) on the network. FIG. 1 shows a system 10 comprising multiple groups of nodes in which each of the groups of nodes 12 is connected to all of the others (illustrated by the lines between groups of nodes). Where traffic is uniformly distributed all paths are equally loaded as shown on the left hand side of the Figure. Where traffic is between pairs of groups of nodes 12 (shown in heavier lines on the right hand side of the Figure) many of the links are unused (thinner lines) with minimal routing. Adaptive routing algorithms select between minimal and non-minimal routing according to network load. This choice can be biased to favor minimal or non-minimal routing, for example, so that minimal routing can be preferred when the load is lower.

In general, global communication patterns (all-to-all or FFT for example) perform well with minimal routing and local-communication patterns (nearest neighbor for example) perform well with non-minimal (or some element of non-minimal) routing. However, the best routing algorithm for a given application is not generally known in advance. An application that exhibits uniform behavior over a long period of time may not do so over short periods. An application may use local communication in one phase and non-local in another. A good default algorithm is desired.

SUMMARY OF THE INVENTION

The invention achieves technical advantages as a system and algorithm configured to generate diversity at the traffic source so that packets are uniformly distributed over all of the available paths, but to increase the likelihood of taking a minimal path with each hop the packet takes. This is achieved by configuring the routing so as to prefer non-minimal paths at the injection point, but increasingly prefer minimal paths as the packet proceeds, referred to herein as Increasing Minimal Bias (1 MB).

BRIEF DESCRIPTION OF THE FIGURES

FIG. 4 shows an all-to-all network connecting 8 groups, where rank3 links connect each group to every other group via an optical cable;

FIG. 5 shows a single cabinet group (48 Aries), where each row represents a chassis, where rank1 links (horizontal links between Aries in a chassis) are in the chassis backplane, and rank2 links (vertical links between Aries in other chassis) are connected via electrical cables, and where four nodes are connected to each Aries;

FIG. 6 shows local minimal and non-minimal paths in a Cascade group (96 Aries);

FIG. 7 shows performance of All-to-All PUTS, 8 Groups;

FIG. 8 shows performance of All-to-All GETS, 8 Groups;

FIG. 9 shows per NIC performance of 64 byte writes of synthetic nearest neighbor traffic; and FIG. 10 shows per NIC performance of 64-byte write traffic from the CTH application.

DETAILED DESCRIPTION OF THE PREFERRED EMBODIMENT

Cascade is a Cray Inc. network with hierarchy of all-to-all connections which will be described as one preferred embodiment of the invention, however, other such types of networks are well suited for the present invention. Cascade uses a method known as progressive adaptive routing to select the path taken by each packet. Each router makes a local routing decision using the load information available to it. In Cascade a choice is made between minimal and non-minimal paths based upon their load and a set of pre-configured biases. This choice is made independently for every packet. Load information is updated at high frequency so that packet routing decisions are made using up-to-date information. The bias settings can be tuned for individual traffic patterns, but again the detailed short time behavior of a given application is not known in advance. A good default algorithm is required.

The idea and advantages behind the algorithm of the present invention is to generate diversity at the traffic source so that packets are uniformly distributed over all of the available paths, but to increase the likelihood of taking a minimal path with each hop the packet takes. This is achieved by configuring the routing biases so as to prefer non-minimal paths at the injection point, but increasingly prefer minimal paths as the packet proceeds. Hence the name: Increasing Minimal Bias (IMB).

In one preferred implementation of the invention, the bias towards minimal routing is implemented using knowledge of the connectivity of the Cascade network. In another preferred implementation of the invention, the bias towards minimal routing uses a count of the number of hops traversed by a packet, or a packet age carried in the header.

This invention is valuable because the performance of a network with hierarchy of all-to-all connection, such as but not limited to a Dragonfly network, and hence the cost effectiveness relative to other high bandwidth topologies such as fat tree, lies in the extent to which traffic is minimally routed. With 100% minimal routing there is a 2:1 advantage, with 100% non-minimal routing there is no advantage. The increasing minimal bias algorithm results in minimal routing of a higher percentage of traffic. As such it improves performance and cost effectiveness.

Figure 1:
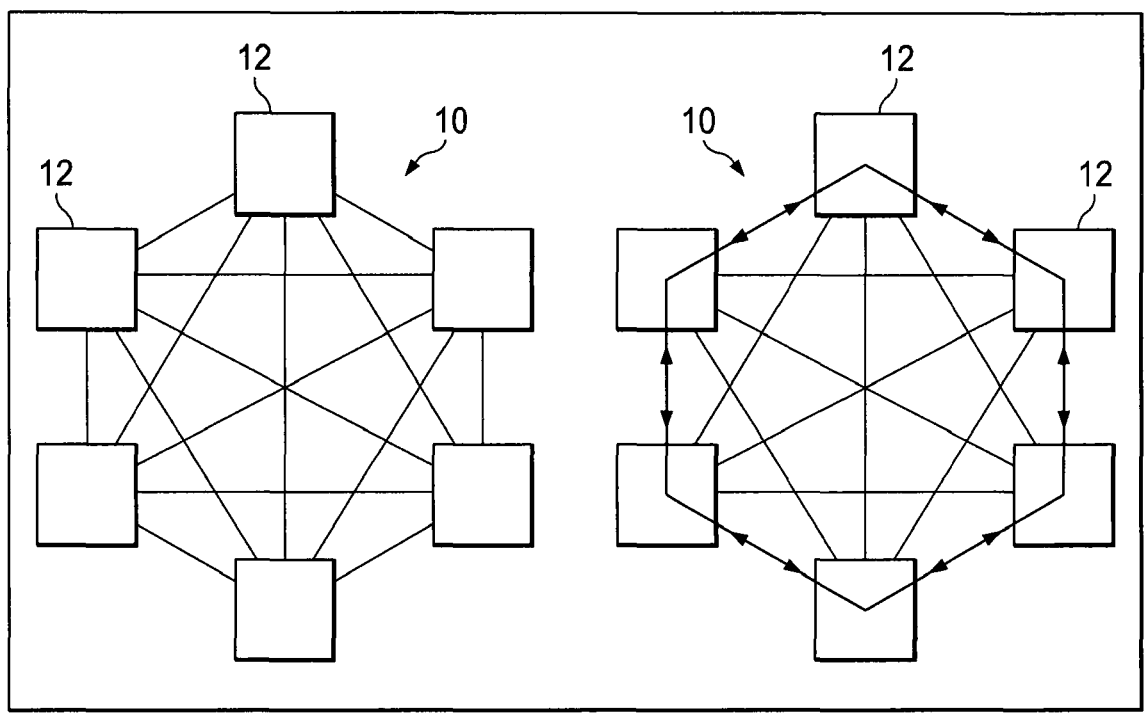
FIG. 1 depicts multiple groups of interconnected nodes with uniform traffic distribution on the left half and unequally loaded paths on the right side.
Figure 2:
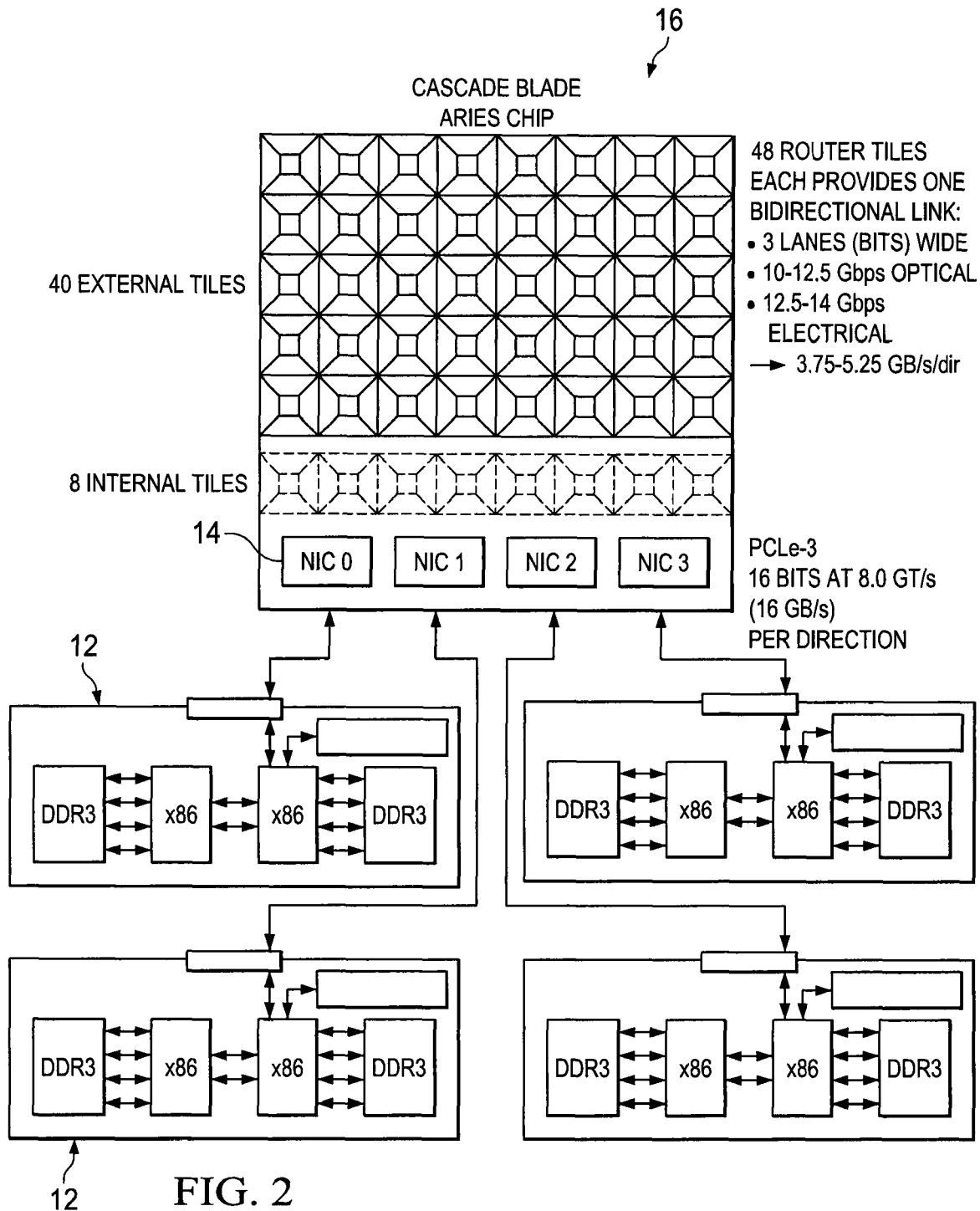
FIG. 2 shows a blade with an Aries chip and four network interface cards (NICs)

The Cascade systems consist of nodes 12, with a blade shown in FIG. 2. A Cascade standard network connects each processing node 12 to a single Aries network interface (NIC) 14. Since there are four NICs 14 on each Aries chip, shown at 16, there are four processor nodes 12 connected to each Aries chip 16. However, each processor node 12 is its own independent node (no shared resources except the network fabric).

Figure 3:
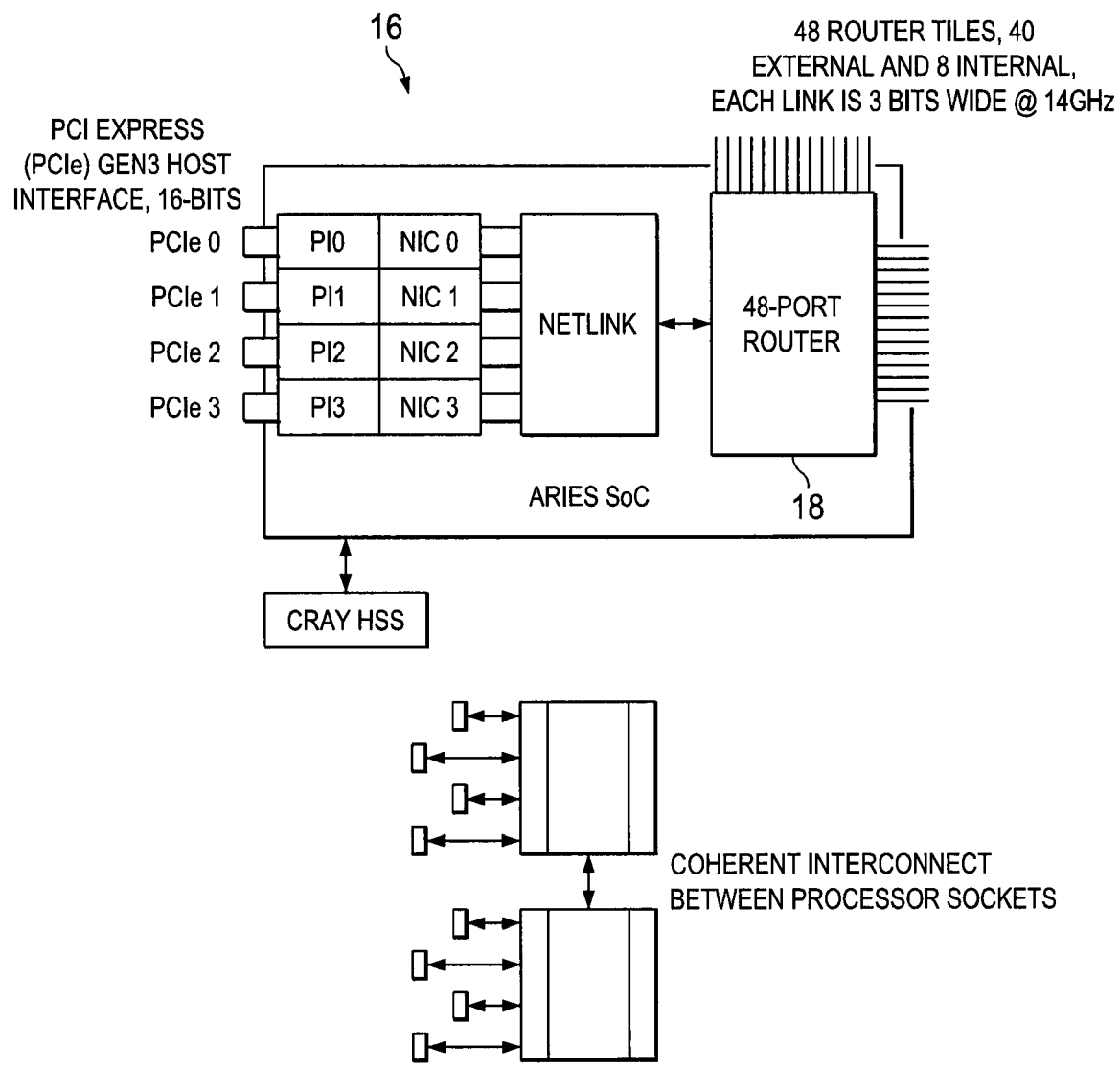
FIG. 3 shows an Aries ASIC with four independent NICs and a 48-port tiled router.

The Aries chip 16 shown in FIG. 3 includes four NICs 14 and a 48 port network switch 18. Eight ports (also called tiles) connect to NICs, while the other 40 connect to network ports. Each network port drives three lanes with SerDes running at up to 14 Gbps, providing up to 5.25 GB/s raw bandwidth per port.

The Aries system chip switch is tailored to support the Dragonfly network topology. In the Dragonfly topology, short network links are connected with electrical cabling, and run at up to 14 Gbps. The longer network links connect via optical fibers and run slower, from 10 to 12.5 Gbps.

Each Aries NIC connects to a node via the PCI Express (PCIe), which transfers 16 bits of data at 8.0 GT/s, or 16 GB/s raw each direction. In a Cray Cascade system each node consists of a pair of Xeon processors connected as a two socket SMP. Other configurations with alternate processor types may be offered during the Aries lifetime.

The Netlink block connects the 4 NICs to 8 router ports, with 2 NICs connecting to the lower 4 ports and 2 NICs connecting to the upper 4 ports. Netlink dynamically load balances the traffic between each pair of NICs and their 4 network ports.

The primary function of the Network Interface Core (NIC) is to convert traffic from and to the Aries Processor Interface (PI) to and from the Aries network via the Netlink (NL) sub-chip. Each Aries chip contains four copies of the NIC.

Requests that the NIC receives from the PI occur as the result of operations performed by software running on the processor that is attached to the PI. The NIC provides software with a number of services for communicating with remote network endpoints.

The Cascade network is a Dragonfly topology, with an all-to-all network between groups (see 8 group system in FIG. 4) and a 2D flattened butterfly within each group (shown in FIG. 5 for a single cabinet group).

The Cascade network is constructed from groups of either 48 or 96 Aries. Each group is a 2 dimensional flattened butterfly, with all-to-all connections in one dimension between the Aries in a chassis (the rank1 links in FIG. 5) and all-to-all connections in the second dimension between chassis (the rank2 links in FIG. 5). Each router provides 10 optical links (the rank3 links in FIG. 4). The rank3 links of the whole group are pooled enabling each group to be connected to up to 240 other groups. In a smaller system groups are connected by multiple links, for example with 9 groups each of 96 Aries there are 120 rank3 links from each group to each of the other groups.

With group sizes of 96 Aries and 4 NICs per router, each group connects 384 nodes. The nodes are dual socket with 8 or more cores per socket. As such each group connects 6144 cores.

Each of the 40 network tiles within an Aries manages one external link, with 15 allocated to each of the rank1 and rank2 dimensions and 10 to the rank3 dimension.

Aries Routing

The Aries network routes packets either deterministically or adaptively along either a minimal or non-minimal path. A local minimal route (within a group) will always take at most one rank1 and one rank2 hop as shown in FIG. 6.

A global minimal route (between groups) will route minimally in both the source and target groups, and will take exactly one rank3 link. Note that minimal routing implies a direct route between a source and a target, not the minimal number of hops required. Paths between the same source/target group may differ in hop count if, for instance, one does not require a rank1 hop and/or rank2 hop in the source and/or target groups due to placement of the rank3 link used in the route.

Non-minimal routing in Aries is an implementation of Valiant's routing algorithm. It is used to avoid congestion and to spread non-uniform traffic evenly over the set of available links in the system. Local non-minimal routes can be thought of as routing "up" from the source Aries to a randomly selected intermediate Aries (one rank1 hop and one rank2 hop) and then minimally "down" to the target (one rank1 hop and one rank2 hop). Non-minimal routing doubles the network load within the group as each packet takes up to 4 hops rather than 2. The Cascade network over-provisions bandwidth within the group so as to compensate for this—there are 15 links in each of the rank1 and rank2 dimensions for 8 links of injection bandwidth. A global non-minimal path will route "up" to an intermediate Aries, anywhere in the system, and then take a minimal path "down" to the target. Table 1 below shows the maximum hop count for minimal and non-minimal routing.

TABLE 1

| | Local | Global |
|---|---|---|
| Minimal | <=2 hops, rank1 and then rank2. | <=5 hops, rank1 then rank2 in source group, rank3, rank1 and then rank2 in target group. |
| Non-minimal | <=4 hops, rank1 and rank2 to intermediate Aries then rank1 and rank2 to target. | <=10 hops, rank1 then rank2 to rank3 port. rank3 hop, then non-minimal path within intermediate group. rank3 hop to target group then rank1 and rank2 to target Aries. |

Dimension order routing is used within the group (rank1 first and then rank2) reducing the number of virtual channels required. The virtual channel is incremented as we move from one group to another and for non-minimal routing as we detect root in the intermediate group.

Adaptive Routing

Aries also provides packet-by-packet adaptive routing. Adaptive routing can be thought of as routing "up" in a constrained way so that the intermediate Aries is also the target and the packet takes a minimal path. If congestion is encountered along the way then the packet will diverge from the minimal path, taking a non-minimal route to the target.

Each Aries along the path will attempt to route minimally but may select non-minimal paths so as to avoid congestion. Routing decisions are made locally by each Aries. The route pipe selects two minimal and two non-minimal paths to the target. An output port is selected from this choice according to the congestion metric for each of these paths. The congestion metric includes the total amount of queued traffic at the output tile, an estimate of the amount of queued traffic at the input of the next Aries in the path and an explicitly communicated measure of downstream congestion. This estimate of load is provided for each of the four possible output ports. A bias towards minimal or non-minimal routing is applied and the lightest loaded port is selected.

Aries provides four adaptive routing control modes, each with their own congestion biases. Each bias is specified in terms of a shift (0, 1 or 2 bits) followed by a constant addition (6-bit) applied separately to the (4-bit) minimal and non-minimal load statistics.

TABLE 2

| Mode | Minimal shift | Minimal add | Non-min shift | Non-minimal add |
|---|---|---|---|---|
| Strong minimal | 0 | 0 | 1 | 10 |
| Prefer minimal | 0 | 0 | 0 | 10 |
| Prefer non-min | 0 | 10 | 0 | 0 |
| Strong non-min | 1 | 10 | 0 | 0 |

The configuration of these biases is site specific as is the default adaptive routing mode. The site selects system wide defaults according the anticipated workload. Users can then select one of the four adaptive routing control modes, via an environment variable.

Each Aries has enough bandwidth for all traffic from the NICs to be routed to the rank3 links (the excess of rank3 links over processor links, ten versus eight, allows for optical cables operating at approximately 80% of the data rate of the copper). The high local bandwidth provided by the rank1 and rank2 links is commensurate with having to take two local hops versus one rank3 optical link per traversal. Global bandwidth scales with the system size because the diameter of the network is constant.

Aries Route Tables

There are four routing tables per tile, local minimal, local non-minimal, global minimal and global non-minimal. The local tables are used to route to Aries within the same group, the global tables are used to route to Aries in other groups. Their use is summarized in Table 3 below.

TABLE 3

| Table | Where used |
|---|---|
| Local minimal | Routing within the target group. |
| Global minimal | Routing within the source or intermediate group, selecting a path to a rank3 port that connects to the target group. |
| Local non-minimal | Routing within the source group (when source and target are the same) and the intermediate group prior to detecting root. |
| Global non-minimal | Routing within the source group, selecting a path to a rank3 port that connects to the intermediate group. |

The routing tables are initialized at startup and provide both the deterministic and adaptive routing modes a list of valid links to use in routing a packet.

Implementation of the IMB Algorithm on Aries

The goal of the IMB algorithm is to 'spread out' the network traffic at the source, then minimize the number of hops as the packet nears its destination. This is accomplished by configuring the congestion bias settings differently for each of the 4 tile types (P-tile, rank1-tile, rank2-tile, and rank3-tile). The source of the packet is always a P-tile, so in order to spread out the traffic at the source these tiles will have a bias towards non-minimal. Packets progress through the network in a rank1, rank2, rank3 order, so rank1 tiles will have slightly less non-minimal bias, rank2 tiles will have a bias towards minimal, possibly neutral, and rank3 tiles will have a bias further towards minimal. Table 4 through Table 7 below show an example of how the congestion bias tables are configured for each of the 4 tile types. Note that only the IMB entry in the table changes for the different tile types, the other 3 Adaptive modes remain the same on all the tiles.

TABLE 4

Bias settings for P-tiles

| Mode | Minimal Shift | Minimal Add | Non-Min Shift | Non-Min Add |
|---|---|---|---|---|
| IMB (Strong Non-Min) | 1 | 10 | 0 | 0 |
| Prefer Min | 0 | 0 | 0 | 10 |
| Prefer Non-Min | 0 | 10 | 0 | 0 |
| No-Bias | 0 | 0 | 0 | 0 |

TABLE 5

Bias settings for rank1-tiles.

| Mode | Minimal Shift | Minimal Add | Non-Min Shift | Non-Min Add |
|---|---|---|---|---|
| IMB (Prefer Non-Min) | 0 | 10 | 0 | 0 |
| Prefer Min | 0 | 0 | 0 | 10 |
| Prefer Non-Min | 0 | 10 | 0 | 0 |
| No-Bias | 0 | 0 | 0 | 0 |

TABLE 6

Bias settings for rank2-tiles.

| Mode | Minimal Shift | Minimal Add | Non-Min Shift | Non-Min Add |
|---|---|---|---|---|
| IMB (No Bias) | 0 | 0 | 0 | 0 |
| Prefer Min | 0 | 0 | 0 | 10 |
| Prefer Non-Min | 0 | 10 | 0 | 0 |
| No-Bias | 0 | 0 | 0 | 0 |

TABLE 7

Bias settings for rank3-tiles

| Mode | Minimal Shift | Minimal Add | Non-Min Shift | Non-Min Add |
|---|---|---|---|---|
| IMB (Strong Min) | 0 | 0 | 1 | 10 |
| Prefer Min | 0 | 0 | 0 | 10 |
| Prefer Non-Min | 0 | 10 | 0 | 0 |
| No-Bias | 0 | 0 | 0 | 0 |

Performance Improvements with IMB

This section illustrates the performance benefit of IMB. Results were obtained using a simulation model of the Aries chip and on prototype hardware.

Simulation Results

This study utilized rtrsim, a cycle-accurate ARIES router simulator that includes various methods for generating network traffic, including synthetic traffic generators and a trace-based mechanism. Rtrsim allows the user to configure an ARIES based system that consists of a single-group network (96 Aries) all the way up to a 241-group network (23,136 ARIES). The following traffic patterns were analyzed.

All-to-All GET traffic
All-to-All PUT traffic
Nearest Neighbor applications
All-to-All PUT Performance, 8-Group System This simulation consisted of each endpoint injecting messages of size 64 bytes to 128K bytes. Each message consisted of cache-line sized PUT request packets to random (evenly distributed) destinations in the network. Each request packet was 14 flits in length and it generated a 1 flit response packet. The address for the first packet of each message was random but stayed sequential for the remaining packets in that message. The traffic generator allowed a maximum of 1024 outstanding packets at any given time.

Each message size was simulated using six different routing modes for the request packets; Non-Minimal-Hashed, Minimal-Hashed, Adaptive-No-Bias, Adaptive-Prefer-Minimal, Adaptive-Prefer-Non-Minimal and the new IMB. The response packets were always routed with the Adaptive-No-Bias mode.

Table 8 below shows the Adaptive Routing Bias Table settings for the 3 different adaptive modes.

TABLE 8

| | m_add | m_shift | nm_add | nm_shift |
|---|---|---|---|---|
| Adaptive-No-Bias | 0 | 0 | 0 | 0 |
| Adaptive-Prefer-Minimal | 0 | 0 | 5 | 0 |
| Adaptive-Prefer-Non-Minimal | 5 | 0 | 0 | 0 |

The graph in FIG. 7 shows the performance of All-to-All PUTS on an 8 group system. Note that the performance of IMB remains fairly constant across the various messages sizes, while the performance of the other adaptive algorithms varies.

All-to-All GET Performance, 8-Group System

This simulation consisted of each endpoint injecting messages of size 64 bytes to 128K bytes. Each message consisted of cache-line sized GET request packets to random (evenly distributed) destinations in the network. Each request packet was 3 flits in length and it generated a 12 flit response packet. The address for the first packet of each message was random but stayed sequential for the remaining packets in that message. The traffic generator allowed a maximum of 1024 outstanding packets at any given time and it modeled a 500 ns request-to-response packet latency.

The graph in FIG. 8 shows that IMB is superior to all other routing modes across all message sizes.

Nearest Neighbor Applications Performance, 8 Group System

High MPI message latencies have driven a number of applications (CTH and Sage in particular) to a bulk-synchronous communications model in which each process computes updates to its cells and then exchanges whole faces (multiple Mbytes in size) with its neighbors. FIG. 9 and FIG. 10 below show again that IMB routing performs better than adaptive non-minimal routing for a synthetic nearest neighbor application and a trace from a real application called CTH.

In this application benchmark results have been shown for different applications as a function of message size using a range of routing modes. For small messages, good performance from more minimal routing algorithms is achieved because the traffic is uniform with a high degree of path diversity. For large messages path diversity is low and performance of more minimal routing modes begins to degrade while the performance of the other more non-minimal routing modes performed relatively better.

The new routing algorithm (IMB) performs well for all kind of applications and communication patterns and doesn't show performance drop-off for large all-to-all messages. As a result, the new IMB routing algorithm is a good candidate as a default routing algorithm for Cray Cascade scalable HPC system.

Having thus described several illustrative embodiments, it is to be appreciated that various alterations, modifications, and improvements will readily occur to those skilled in the art. Such alterations, modifications, and improvements are intended to be part of this disclosure, and are intended to be within the spirit and scope of this disclosure. While some examples presented herein involve specific combinations of functions or structural elements, it should be understood that those functions and elements may be combined in other ways according to the present invention to accomplish the same or different objectives. In particular, acts, elements, and features discussed in connection with one embodiment are not intended to be excluded from similar or other roles in other embodiments. Accordingly, the foregoing description and attached drawings are by way of example only, and are not intended to be limiting.

The invention claimed is:

1. A processor interconnect network for providing communication pathways between a plurality of processor nodes within a multiprocessor computer system, the interconnect network comprising:
a plurality of routers to dynamically route a data packet along a network path from a source node to a destination node, wherein the source node is one of the plurality of processor nodes and the destination node is one of the plurality of processor nodes, wherein the network path comprises a sequence of hops involving a subset of the plurality of routers, with each of the routers within the sequence of hops are configured to select a next hop based upon network congestion information from neighboring routers and a routing table comprising biases;
wherein a first hop in the sequence of hops is selected by a first router using the congestion information provided to the first router and a first bias which is a non-minimal bias having the ability to increase the probability that the first hop is a non-minimal hop; and
wherein a subsequent hop in the sequence of hops is selected by a subsequent router using the congestion information provided to the subsequent router and a subsequent bias which is a bias toward minimal routing having the ability to increase the probability that the subsequent hop is a minimal hop.

2. The processor interconnect network of claim 1 wherein the first hop and the subsequent hop are adjacent one another in the in the sequence of hops.

3. The processor interconnect network of claim 1 wherein the sequence of hops further comprises a second subsequent hop selected by a second subsequent router using the congestion information provided to the second subsequent router and a second subsequent bias which is a minimal routing bias which will further increase the probability that the subsequent hop is a minimal hop.

4. The processor interconnect network of claim 3 wherein the bias toward minimal routing is a neutral bias.

5. The processor interconnect network of claim 4 wherein the first router, the first subsequent router and the second subsequent router are not adjacent one another in the sequence of hops.

6. The processor interconnect network of claim 1 wherein the first router is in the source node.

7. The processor interconnect network of claim 1 wherein the first router is connected to the source node.

8. The processor interconnect network of claim 3 wherein the second subsequent router is connected to the destination node.

9. The processor interconnect network of claim 1 wherein the congestion information comprises load statistics, and the bias is provided by applying a predetermined shift or add to the load statistics, thus providing a biased load statistic.

10. The processor interconnect network claim 9 wherein each of the plurality of routers will be provided with a plurality of possible routes, comprising two minimal routes and two non-minimal routes, and will be provided with congestion information each of the plurality of possible routes, and where each router will select between plurality of routes by examining the congestion information the make routing decisions based upon the biased load statistic.

11. A multiprocessor computer system including a processor interconnect network, the multiprocessor computer system comprising:
a plurality of routers configured to dynamically route a data packet along a network path across the processor interconnect network, the network path made up of a sequence of hops from a source node to a first one of the plurality of routers and then to at least a subsequent one of the plurality of routers until the data packet reaches a destination node, each router in the sequence of hops being configured to select a next hop from among a plurality of possible hops based on network congestion information from neighboring routers and a routing table comprising biases;
wherein a first hop from the source node to a first one of the plurality of routers is selected as a function of said congestion information and the application of a first bias which will promote the use of a non-minimal routing methodology, and
wherein a subsequent hop within the network path is selected as a function of said congestion information and the application of a bias towards minimal routing, wherein the bias toward minimal routing will increase the likelihood of selecting a minimal routing methodology.

12. The multiprocessor computer system of claim 11, wherein bias toward minimal routing used by the first router is a neutral said bias.

13. The multiprocessor computer system of claim 12 further comprising selecting an additional subsequent hop toward the destination node, wherein the additional subsequent hop is selected as a function of a minimal routing said bias.

14. The multiprocessor computer system of claim 11 wherein the routing table biases are a function of the respective said router in the system.

15. The multiprocessor computer system of claim 11 wherein the routing table biases are a function of a count of the number of hops traversed by the data packet.

16. The multiprocessor computer system of claim 11 wherein the routing table biases are a function of an age of the data packet.

17. The multiprocessor computer system of claim 11 wherein the bias applied to determine a hop of the data packet is determined by a processor associated with each said router as a function of the routing table.

18. The multiprocessor computer system of claim 13 wherein when the first hop is established the non-minimal routing bias is a default bias.

19. The multiprocessor computer system of claim 18 wherein when the subsequent hop is established the neutral said bias is a default bias.

20. The multiprocessor computer system of claim 19 wherein when the additional subsequent hop is established whereby the minimal routing bias is a default bias.

21. The multiprocessor computer system of claim 11 wherein the congestion information comprises load statistics, and the bias is provided by applying a predetermined shift or add to the load statistics, thus providing a biased load statistic.

22. The multiprocessor computer system of claim 21 wherein each of the plurality of routers will be provided with a plurality of possible routes, comprising two minimal routes and two non-minimal routes, and will be provided with congestion information each of the plurality of possible routes, and where each router will select between plurality of routes by examining the congestion information the make routing decisions based upon the biased load statistic.

23. The multiprocessor computer system of claim 11 wherein the additional subsequent hop moves from the first router to a second router.

24. A method of operating a multiprocessor computer system, comprising:
dynamically routing a data packet through a plurality of routers which form a plurality of network paths from a source node to a destination node as a function of a plurality of routing tables contained within the plurality of routers, with each routing table comprising biases, wherein each of the plurality of routers making routing decisions based on network congestion information from neighboring routers;
wherein each said network path consists of a sequence of hops, and wherein a first hop from the source node to a first said router is selected based upon said congestion information and a non-minimal routing said bias which promotes the selection of a non-minimal hop, and wherein a subsequent hop in the network path is selected based upon the said congestion information and a bias towards minimal routing which increases the probability that a minimal hop will be selected.

25. The method of claim 24 wherein the bias toward minimal routing is a neutral said bias.

26. The method of claim 24 further comprising selecting a third hop from the second router to the destination node as a function of a minimal routing said bias.

27. The method of claim 24 wherein the routing table biases are a function of the respective said router in the system.

28. The method of claim 24 wherein the routing table biases are a function of a count of the number of hops traversed by the data packet.

29. The method of claim 24 wherein the routing table biases are a function of an age of the data packet.

30. The method of claim 24 wherein the bias applied to determine a hop of the data packet is determined by a processor associated with each said router as a function of the routing table.

31. The method of claim 24 wherein the first hop is established whereby the non-minimal routing bias is a default bias.

32. The method of claim 31 wherein the second hop is established whereby the neutral said bias is a default bias.

33. The method of claim 32 wherein the third hop is established whereby the minimal routing bias is a default bias.

34. The method of claim 24 wherein the congestion information comprises load statistics, and the bias is provided by applying a predetermined shift or add to the load statistics, thus providing a biased load statistic.

35. The method of claim 34 wherein each of the plurality of routers will be provided with a plurality of possible routes, comprising two minimal routes and two non-minimal routes, and will be provided with congestion information each of the plurality of possible routes, and where each router will select between plurality of routes by examining the congestion information the make routing decisions based upon the biased load statistic.

* * * * *